United States Patent
Irish et al.

(10) Patent No.: US 10,422,865 B2
(45) Date of Patent: Sep. 24, 2019

(54) TIME-DEPENDENT FILTERING FOR LIDAR SIGNALS

(71) Applicant: QUALCOMM Incorporated, San Diego, CA (US)

(72) Inventors: Linda Irish, San Diego, CA (US); William Henry Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 15/258,889

(22) Filed: Sep. 7, 2016

(65) Prior Publication Data

US 2018/0067196 A1 Mar. 8, 2018

(51) Int. Cl.
*G01S 7/48* (2006.01)
*G01S 7/486* (2006.01)
*G01S 17/10* (2006.01)
*G01S 7/487* (2006.01)

(52) U.S. Cl.
CPC ............ *G01S 7/4865* (2013.01); *G01S 7/487* (2013.01); *G01S 7/4861* (2013.01); *G01S 17/10* (2013.01)

(58) Field of Classification Search
CPC ...... G01S 17/10; G01S 7/4816; G01S 7/4868; G01S 7/489; G01S 7/497
See application file for complete search history.

(56) References Cited

U.S. PATENT DOCUMENTS

| | | | |
|---|---|---|---|
| 6,481,625 B2 | 11/2002 | Lucera et al. | |
| 7,187,452 B2 | 3/2007 | Jupp et al. | |
| 7,301,608 B1 * | 11/2007 | Mendenhall | G01S 17/107 356/4.01 |
| 8,855,256 B1 | 10/2014 | French et al. | |
| 9,140,643 B2 | 9/2015 | Bellian et al. | |
| 9,867,250 B1 * | 1/2018 | Powers | H03K 5/08 |
| 2004/0085526 A1 | 5/2004 | Gogolla et al. | |
| 2011/0149268 A1 * | 6/2011 | Marchant | G01P 5/001 356/27 |
| 2014/0158870 A1 | 6/2014 | Deantonio et al. | |
| 2015/0124242 A1 | 5/2015 | Pierce et al. | |

FOREIGN PATENT DOCUMENTS

| | | |
|---|---|---|
| WO | 2010149219 A1 | 12/2010 |
| WO | 2015180770 A1 | 12/2015 |

OTHER PUBLICATIONS

International Search Report and Written Opinion—PCT/US217/045408—ISA/EPO—dated Oct. 26, 2017.

* cited by examiner

*Primary Examiner* — Luke D Ratcliffe
(74) *Attorney, Agent, or Firm* — Kilpatrick Townsend & Stockton

(57) ABSTRACT

Methods, computer-readable media, and apparatuses for estimating a distance of an object from a Light Detection and Ranging (LIDAR) system is disclosed. In one embodiment, the method includes transmitting a first light signal towards the object using a LIDAR system, and detecting a second light signal by a light sensor to generate a detected signal. The second light signal includes a reflection of the first light signal from the object. The method further includes generating a filtered signal by applying a time-dependent adjustable filter to the detected signal, and estimating the distance of the object from the LIDAR system based at least on the filtered signal.

24 Claims, 7 Drawing Sheets

TIME-DEPENDENT FILTERING FOR LIDAR SIGNALS

TECHNICAL FIELD

The present disclosure relates generally to Light Detection and Ranging (LIDAR), and in particular, to time-dependent filtering for baseband LIDAR signals.

BACKGROUND

Light detection and ranging (LIDAR) is a method of sensing distances of distant objects by using reflected light, usually from a laser. LIDAR systems may be used in different terrestrial, airborne and mobile applications. For example, LIDAR systems may be used to generate high-resolution maps in airborne geo-mapping applications, ground-based surveying, underwater scanning, and the like. In addition, LIDAR systems may be used in "radar guns" by police to monitor traffic speeds. In addition, LIDAR systems may be used in automotive applications for driver assistance situations and/or self-driving cars. Typically, these LIDAR systems have a range and field of view to detect objects, such as other automobiles, at an appropriate distance to take any necessary action, such as warning the driver or changing the speed of the automobile.

LIDAR systems could operate on the basis of various types of optical output signals, such as continuous wave Doppler, pulsed Doppler, continuous wave phase-shift keying (CW-PSK), pulsed PSK, and the like. As an example, the LIDAR system emits a short pulse of infrared light that is directed in a narrow beam toward a selected target. The light pulse strikes the target and is reflected back towards the LIDAR system. The reflected energy is captured by an optical receiving element and is converted from light energy to an electrical signal. A high speed clock is used to determine the total trip time, which can then be used to calculate the range to the target. In another application, for calculating speed of a target, multiple ranges are taken and the change in range over a short period of time is determined. The maximum range that a LIDAR system can achieve is proportional to the amount of energy emitted per pulse by the light source. There is a need in the art to increase range and/or accuracy of the LIDAR systems.

SUMMARY

Figure 1:
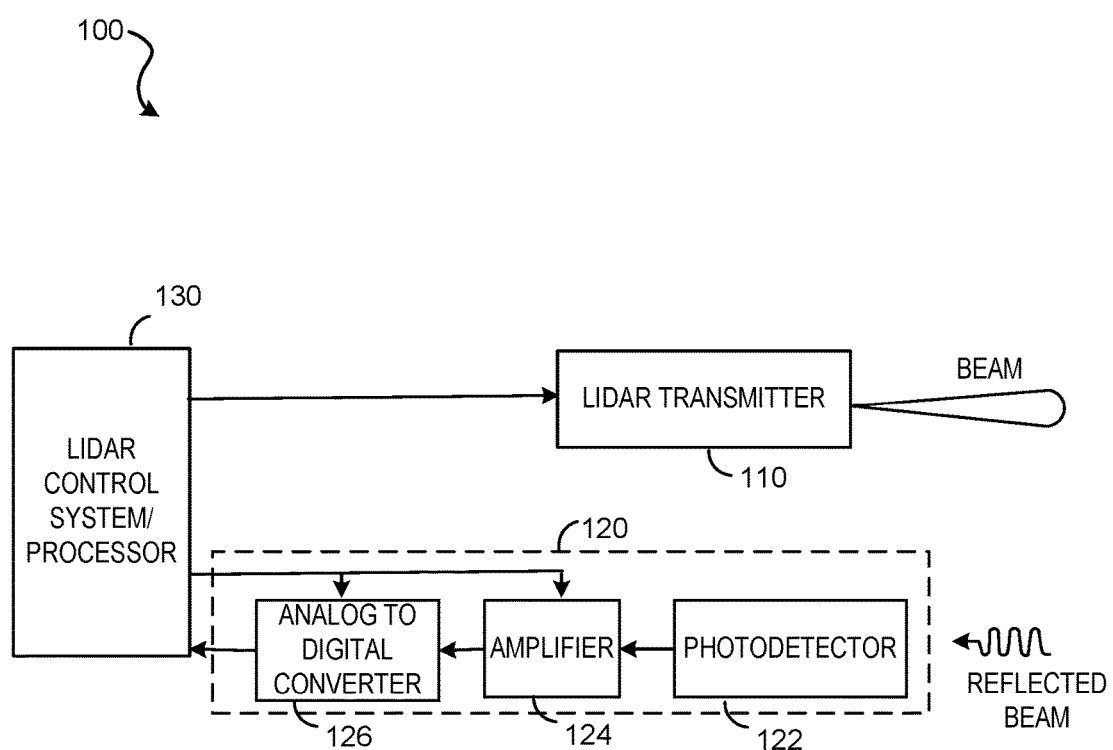
FIG. 1 illustrates an example LIDAR system, according to one embodiment of the present disclosure.

In one example, a method for estimating a distance of an object from a Light Detection and Ranging (LIDAR) system is disclosed. The method includes, in part, transmitting a first light signal towards the object using a LIDAR system, and detecting a second light signal by a light sensor to generate a detected signal. The second light signal may include a reflection of the first light signal from the object. The method further includes generating a filtered signal by applying a time-dependent adjustable filter to the detected signal, and estimating the distance of the object from the LIDAR system based at least on the filtered signal.

In one example, the time-dependent adjustable filter includes at least a first cutoff frequency corresponding to a first time duration, and a second cutoff frequency corresponding to a second time duration. The first time duration corresponds to the time of transmission of the first light signal and a first time threshold. Similarly, the second time duration corresponds to the time between the first time threshold and the second time threshold.

In one example, the first cutoff frequency is larger than the second cutoff frequency. In one example, the time-dependent adjustable filter is a variable frequency low-pass filter.

In one example, a cutoff frequency of the time-dependent adjustable filter is adjusted based on an elapsed time since transmission of the first light signal. In one example, a frequency of the time-dependent adjustable filter is adjusted based on an expected amount of spreading in the second light signal.

In one example, the time-dependent adjustable filter comprises at least two capacitors disposed in parallel, and one or more switches connected to the at least two capacitors.

In one example, an apparatus for estimating a distance of an object from a LIDAR system is disclosed. The apparatus includes at least one processor and a memory coupled to the at least one processor. The least one processor is configured to transmit a first light signal towards the object using a LIDAR system, and detect a second light signal by a light sensor to generate a detected signal. The second light signal includes a reflection of the first light signal from the object. The at least one processor is further configured to generate a filtered signal by applying a time-dependent adjustable filter to the detected signal, and estimate the distance of the object from the LIDAR system based at least on the filtered signal.

In one example, an apparatus for estimating a distance of an object from a LIDAR system is disclosed. The apparatus includes, in part, means for transmitting a first light signal towards the object using a LIDAR system, and means for detecting a second light signal by a light sensor to generate a detected signal. The second light signal includes a reflection of the first light signal from the object. The apparatus further includes means for generating a filtered signal by applying a time-dependent adjustable filter to the detected signal, and means for estimating the distance of the object from the LIDAR system based at least on the filtered signal.

In one example, a non-transitory processor-readable medium for estimating a distance of an object from a LIDAR system is disclosed. The non-transitory processor-readable medium includes, in part, processor-readable instructions configured to cause one or more processors to transmit a first light signal towards the object using a LIDAR system, and detect a second light signal by a light sensor to generate a detected signal. The second light signal includes a reflection of the first light signal from the object. The processor-readable instructions are further configured to cause the one or more processors to generate a filtered signal by applying a time-dependent adjustable filter to the detected signal, and estimate the distance of the object from the LIDAR system based at least on the filtered signal.

DETAILED DESCRIPTION

Certain embodiments describe a method for an adaptive LIDAR system that is capable of estimating distance and/or speed of objects in an extended range with high accuracy and sensitivity. In one embodiment, time constant of a filter within a LIDAR baseband signal path may be adjusted based on the expected amount of spreading to increase estimation accuracy.

FIG. 1 illustrates an example LIDAR system 100 in accordance with an embodiment of the present invention. As illustrated, LIDAR system 100 may include a LIDAR transmitter 110, a LIDAR receiver 120, and a LIDAR control system/processor 130. LIDAR transmitter 110 may include a light source (e.g., laser source) to generate and transmit the optical output signal into "free space," or any other appropriate optical transmission medium. The optical output signal from LIDAR transmitter 110 is usually directed to an object (e.g., target) that is being analyzed. LIDAR receiver 120 may include a photodetector 122 that receives the reflected optical signal from the target and converts the received optical signal into an electrical representation. A transimpedance amplifier 124 is usually used to amplify the detected signal. An analog to digital converter 126 converts the amplified signal to digital form and passes the signal to the LIDAR control system/processor 130 for further analysis. The processor analyzes the received signal and generates a desired output (e.g., range calculation, speed, characterization of the targeted object, or the like).

In one embodiment, in a time-of-flight LIDAR scanner, a laser beam is scanned over a scene. The time-of-flight between emission of the laser beam and reception of a reflected signal by a photodetector is measured. Distance, speed and other properties of the objects in the scene may be estimated based on the received signal. In general, the objects in the scene that are close to the LIDAR system reflect the light in a short time. A received signal that includes reflections from close objects is usually strong with little or no pulse spreading. Therefore, the signals received from close objects need little amplification, if any, before processing. In addition, the sharp edges of the received signal result in high timing accuracy. Therefore, distances of the close objects can be estimated with high accuracy. On the other hand, objects that are far away from the LIDAR system reflect the laser light over a longer period of time. Also, the received signal from the far objects may be weak, with smooth edges that are caused by pulse spreading. Therefore, the received signal from far objects may need to be amplified before analysis. In addition, low pass filtering removes high frequency components of the received pulse. The low pass filtering may sacrifice accuracy but improves sensitivity, and performance at range.

Current LIDAR systems in the art have fixed filters that are customized for a specific application. As an example, a LIDAR system may either provide high resolution in relatively small ranges, or provide a high range with limited resolution. One embodiment manages the trade-off between resolution and range of the LIDAR systems by adaptively adjusting the filter in the receive chain of the LIDAR system depending on the expected signal spreading in the return signal. The proposed method provides high resolution and high range.

A LIDAR system may use a time-of-flight method to estimate distance from an object. As an example, the LIDAR system transmits a pulse and waits to receive a reflection of the transmitted pulse. By measuring the time between the transmission and reception of the pulse, and using the speed of travel of light (e.g., 300,000 kilometers per second), the LIDAR system estimates distance of the object from the system. If the LIDAR system is very close to an object, the received pulse looks very similar to the transmitted pulse. In addition, the received pulse has a high amplitude. By analyzing the received signal (e.g., rising and falling edges of the pulse), the LIDAR system can measure the distance between the object and the LIDAR system with high accuracy. However, if the LIDAR system applies the same thresholds as used in the estimation of the distance of the "near" objects to analyze the signals that are received from objects that are far from the LIDAR system, distance of the far objects may not be estimated accurately. Certain embodiments propose an adaptive LIDAR system that is capable of estimating distances of both "near" and "far" objects with high accuracy.

Figure 2A:
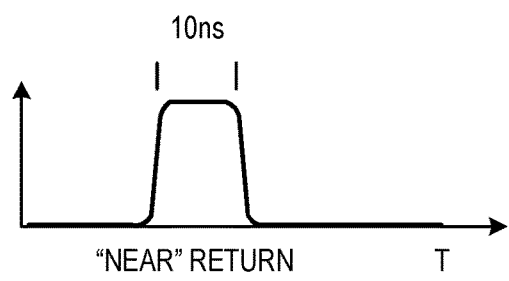
FIGS. 2A and 2B illustrate example reflected signals from objects with different distances from the LIDAR system, according to one embodiment of the present disclosure.
Figure 2B:
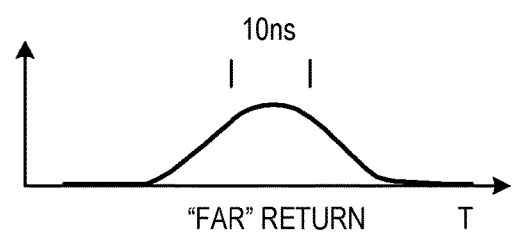

FIGS. 2A and 2B illustrate example reflected signals from objects located at different distances from the LIDAR system. FIG. 2A illustrates an example reflected signal from an object that is close to the LIDAR system (e.g., a "near" object). In this example, a pulse with duration of 10 ns is transmitted by the LIDAR transmitter. The transmitted pulse is reflected from the object and received by the LIDAR receiver. As can be seen, the reflected signal from the close object (that is received by the LIDAR system) resembles the transmitted signal (e.g., sharp edges and high signal strength). FIG. 2B illustrates an example received signal that is reflected from an object far from the LIDAR system. As can be seen, the received signal corresponding to the "far" object has experienced pulse spreading. In general, when an electromagnetic wave travels over a distance, the wave experiences pulse spreading and the edges of the pulse become rounded (as can be seen in FIG. 2B).

In one embodiment, a variable-frequency low pass filter (e.g., an adjustable filter) is used in the baseband signal between the photodetector and the device measuring the delay between laser pulse and reflection. When a short time has elapsed since emission of the light beam, the adjustable band-pass filter may be set to a high cutoff frequency, allowing pulses with sharper edges expected from early return signals to be easily detected and accurately measured. As mentioned earlier, the early return signal also have higher amplitude. When a longer time has elapsed since beam emission, the band-pass filter is set to a lower cutoff frequency. This serves to filter more noise, allowing better detection of small signals. The penalty paid is a slower rise time within the detector, but since beam spreading also causes a reduction in ramp rates of the reflected signal, this is not a significant penalty.

Figure 3:
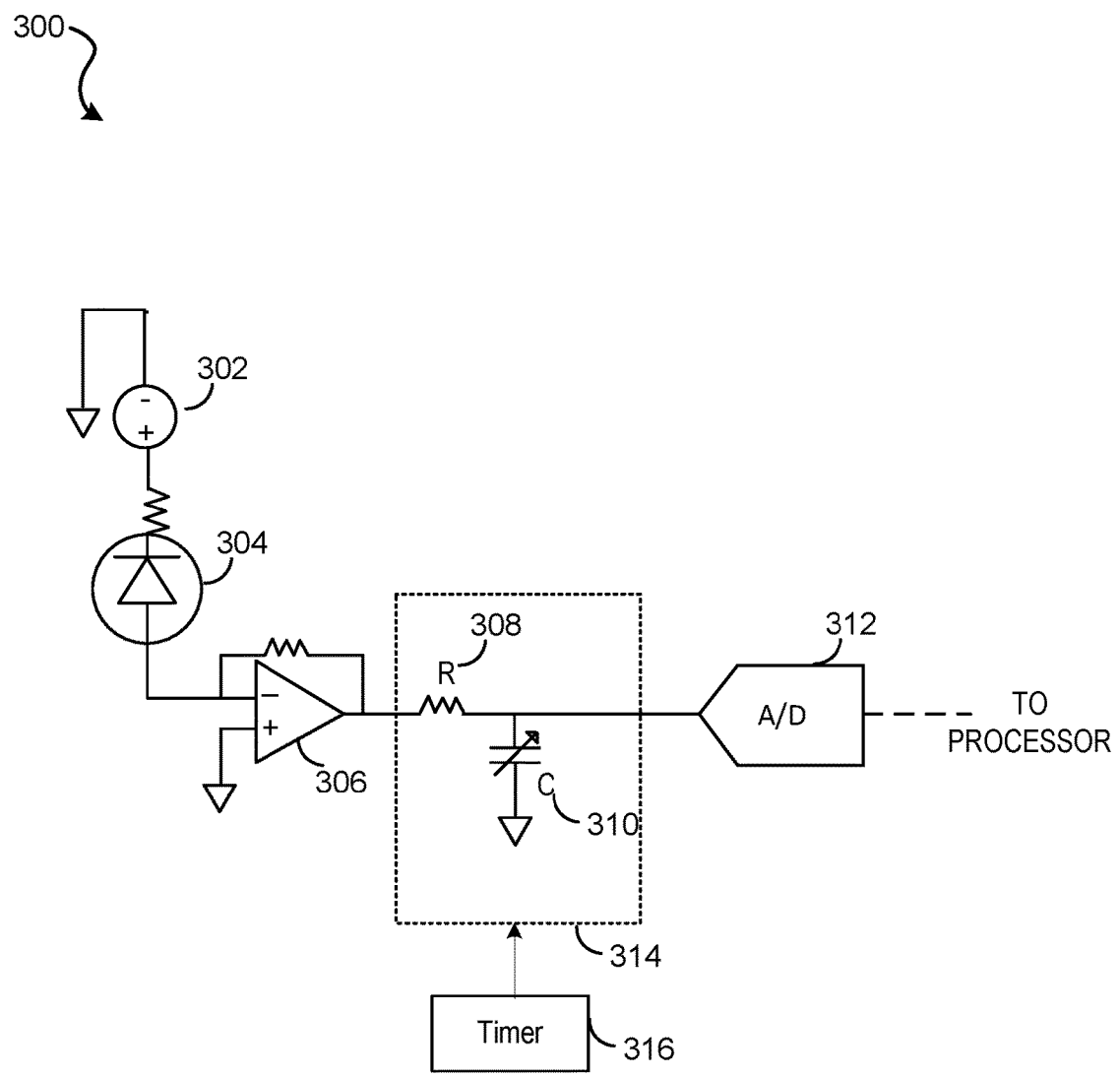
FIG. 3 illustrates an example adjustable LIDAR receiver, according to one embodiment of the present disclosure.

FIG. 3 illustrates an example of an adjustable LIDAR receiver 300, according to one embodiment. As illustrated, the adjustable LIDAR receiver includes a photodiode 304, an amplifier 306, an adjustable RC filter 314, an analog to digital converter (A/D) 312, and other elements (not shown). The photodiode 304 detects the reflected signal and generates a detected signal. The amplifier 306 amplifies the detected signal and passes it to the RC filter. The adjustable RC filter 314 (e.g., including R 308 and adjustable C 310) then filters the amplified signal. The filtered signal is fed through the A/D 312 before being sent to the processor for further analysis. In one embodiment, an adjustable capacitor 310 (e.g., a varactor, or the like) can be used to change the time constant (e.g., equal to 1.1RC) of the filter. For example, for the signals that are reflected from objects that are close to the LIDAR system the filter might be set to a smaller time constant to capture the rising and falling edges of the signal accurately. As an example, in order to accurately estimate distance of the objects that are less than 50 feet away from the LIDAR system (e.g., "near" returns occurring within 100 ns), time constant of the adjustable filter may be set to 5 ns to capture the rising and falling edges of the received pulse accurately. In addition, in order to provide better filtering and better detection of smaller signals that are reflected by the objects that are further away from the LIDAR system, the adjustable filter may be set to a higher time constant after a predefined time threshold is passed since beam emission. As an example, to capture the signals from "far" objects, when 100 ns has passed from the transmission of the original light signal, the filter might be adjusted to a time constant of 10 ns. It should be noted that in general, any number of frequency levels and/or time constants may be used in an adjustable filter within the LIDAR system without departing from the teachings of the present disclosure. In one embodiment, the time-dependent adjustable filter (e.g., the RC filter 314) may have two or more adjustable cut-off frequency levels (e.g., 4, 10, 15, 20 levels, . . . ). In one embodiment, time constant of the adjustable filter may be adapted linearly as a function of the elapsed time since emission of the light pulse.

In one embodiment, a timer 316 can measure time since emission of the light signal (e.g., light pulse). The measured time may be used to control adjustable capacitor 310. For example, cutoff frequency of the time-dependent adjustable filter may be adjusted based on the elapsed time since transmission of the first light signal. In one embodiment, a first cutoff frequency of the adjustable filter may correspond to a first time duration. The first time duration may correspond to the time between transmission of the first light signal and a first time threshold. In addition, a second cutoff frequency of the adjustable filter may correspond to a second time duration. The second time duration may correspond to the time duration between the first time threshold and the second time threshold. In this particular example, the control signal is generated as a linear function of the timer signal, however, in general, any other type of function may be used to generate the control signal in accordance with the elapsed time.

In general, the adjustable filter may be designed in many different ways, without departing from the teachings of the present disclosure. As an example, when a variable capacitor (such as a varactor) is not available, the adjustable filter may be designed using switched capacitors, as shown in FIG. 4.

Figure 4:
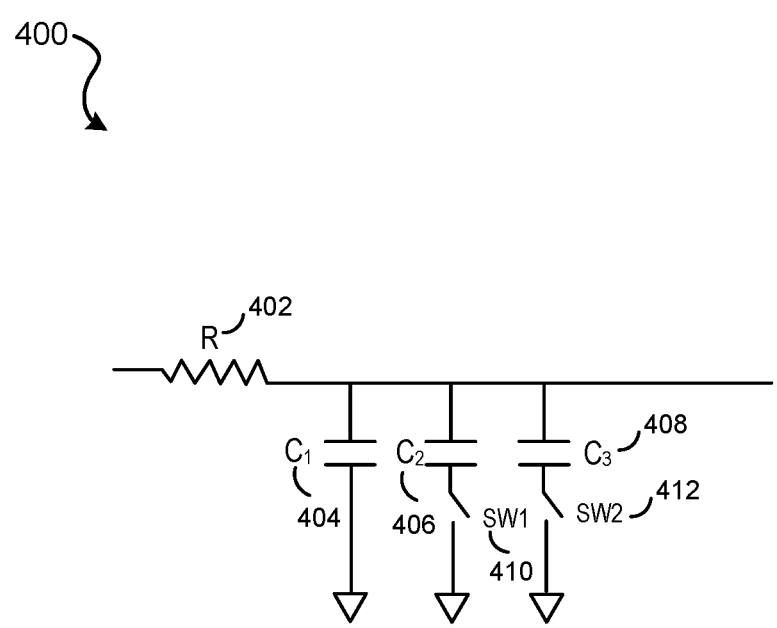
FIG. 4 illustrates an example variable filter using switched capacitors, according to one embodiment of the present disclosure.

FIG. 4 illustrates an example variable filter 400 using switched capacitors, according to one embodiment of the present disclosure. In this example, the variable filter includes a resistor R 402, three capacitors ($C_1$ 404, $C_2$ 406 and $C_3$ 408) and two switches (SW1 and SW2). Depending on position of the switches SW1 and/or SW2, the variable filter circuit can provide four different capacitor values. For example, if both switches are open, the variable filter corresponds to capacitance $C_1$. If SW1 is closed and SW2 is open, the variable filter corresponds to the value of $C_1+C_2$. Similarly, other switch positions correspond to values $C_1+C_3$, and $C_1+C_2+C_3$ (all three capacitors in parallel). It should be noted that in this example, for ease of discussion, only three capacitors are used. However, the variable filter in general, may have any number or type of capacitors and/or switches without departing from the teachings of the present disclosure. In one example, a controller may determine when the switches SW1 and SW2 are opened and/or closed.

Figure 5:
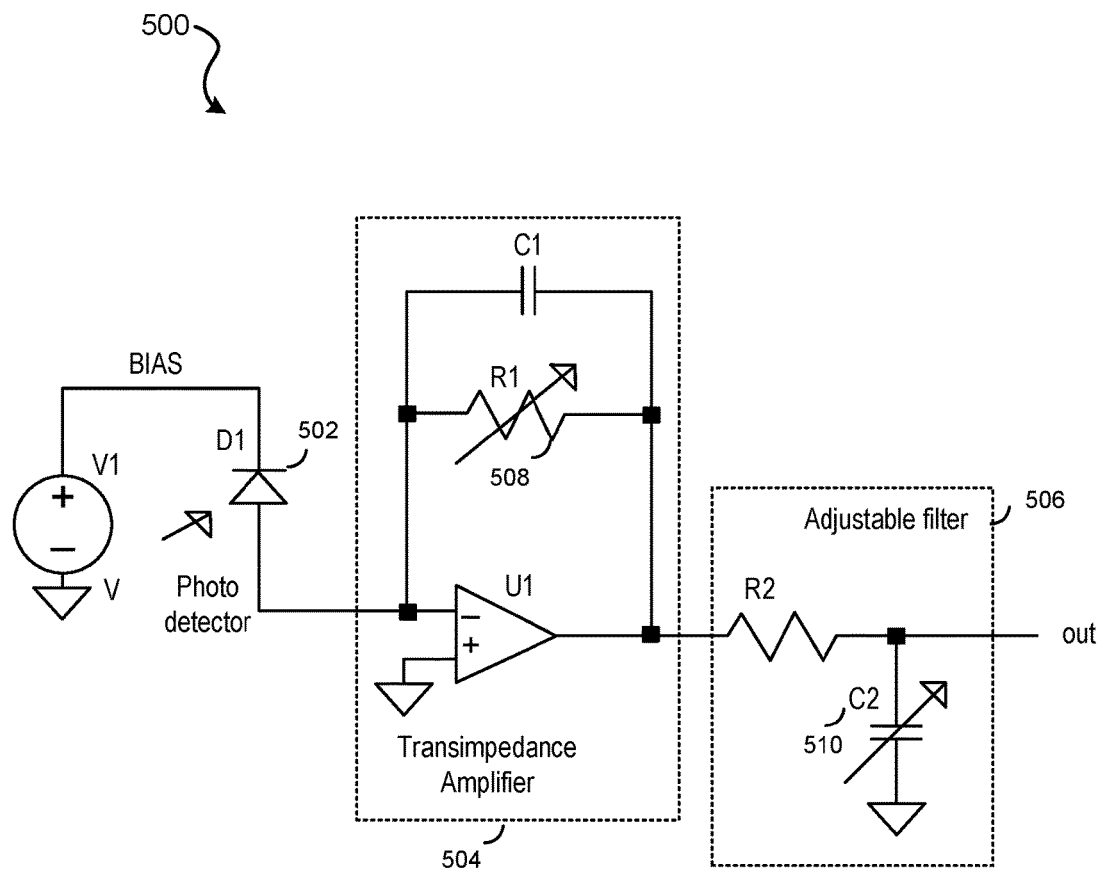
FIG. 5 shows an example LIDAR receiver with an adjustable transimpedance amplifier followed by an adjustable filter, according to one embodiment of the present disclosure.

FIG. 5 shows an example LIDAR receiver 500 with an adjustable transimpedance amplifier followed by an adjustable filter, according to one embodiment. As illustrated, the LIDAR receiver includes a photo detector 502, a transimpedance amplifier 504 and an adjustable filter 506. The transimpedance amplifier 504 includes a variable resistor R1 508. Increasing the value of R1 in the transimpedance amplifier increases the gain and reduces the bandwidth, which is desirable for weak signals. Alternatively, reducing the value of R1 reduces the gain and increases the bandwidth, which is desirable for strong signals. The adjustable filter can be used further to adjust the low-pass cutoff frequency. Output of the adjustable filter could either go to a comparator or a high speed ADC in the LIDAR front end for further processing. In one embodiment, a variable capacitor may be used instead of the capacitor C1 in the transimpedance amplifier to further optimize the gain and bandwidth of the LIDAR receiver.

Figure 6:
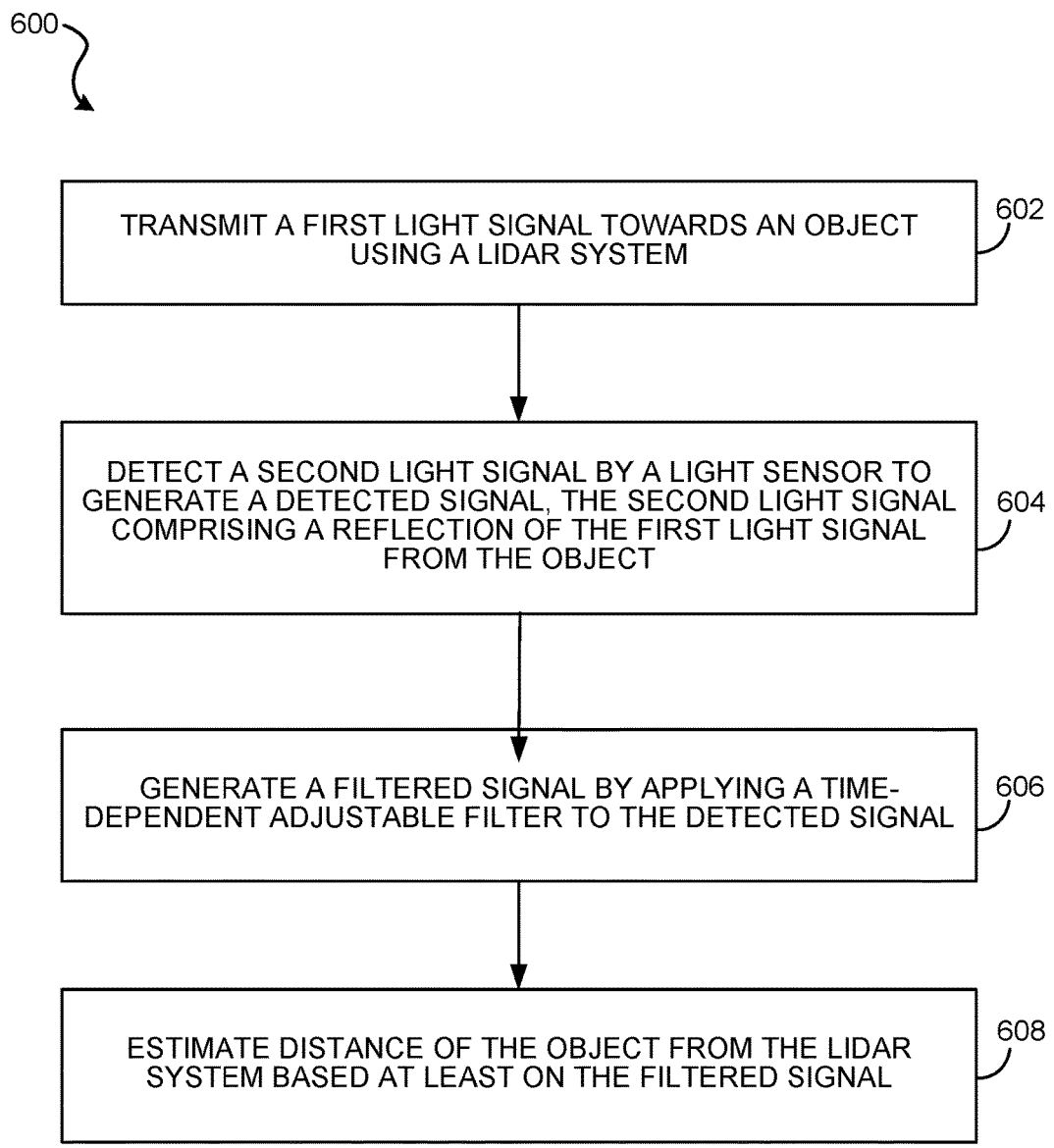
FIG. 6 illustrates example operations that may be performed by a LIDAR system to estimate distance of an object, according to one embodiment of the present disclosure.

FIG. 6 illustrates example operations 600 that may be performed by a LIDAR system to estimate a distance between an object and the LIDAR system. At 602, the system transmits a first light signal towards the object. At 604, the system detects a second light signal by a light sensor to generate a detected signal. The second light signal includes a reflection of the first light signal from the object. At 606, the LIDAR system generates a filtered signal by applying a time-dependent adjustable filter to the detected signal. At 608, the LIDAR system estimates the distance of the object from the LIDAR system based at least on the filtered signal.

Figure 7:
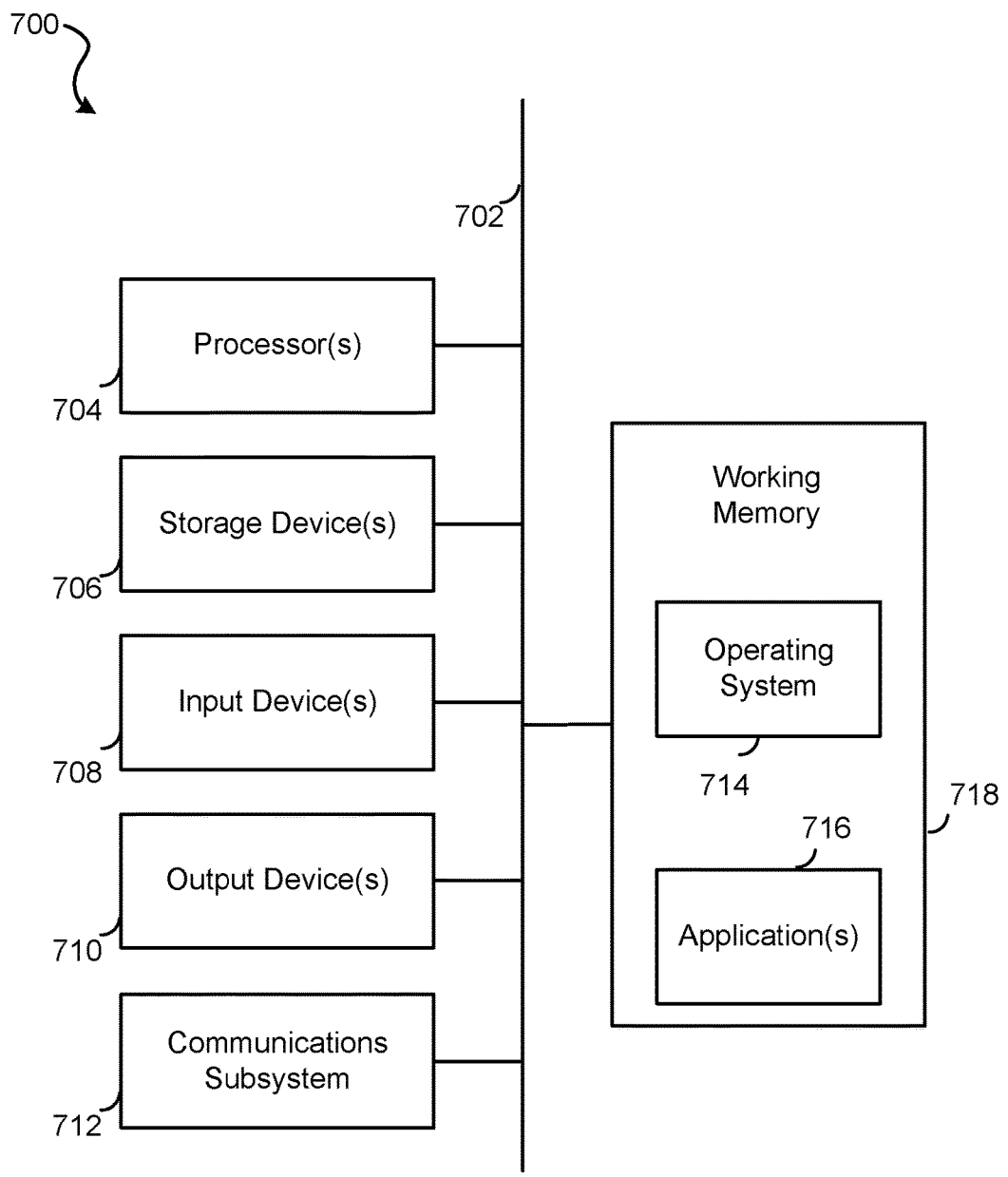
FIG. 7 illustrates an example of a computing system in which one or more embodiments may be implemented.

FIG. 7 illustrates an example of a computing system 700 in which one or more embodiments may be implemented. A computer system as illustrated in FIG. 7 may be may include or be incorporated as part of the above described LIDAR system. FIG. 7 is meant only to provide a generalized illustration of various components, any or all of which may be utilized as appropriate. FIG. 7, therefore, broadly illustrates how individual system elements may be implemented in a relatively separated or relatively more integrated manner. In some embodiments, elements of computer system 700 may be used to implement functionality of a LIDAR system.

The computer system 700 is shown comprising hardware elements that can be electrically coupled via a bus 702 (or may otherwise be in communication, as appropriate). The hardware elements may include one or more processors 704, including without limitation one or more general-purpose processors and/or one or more special-purpose processors (such as digital signal processing chips, graphics acceleration processors, and/or the like); one or more input devices 708, which can include without limitation one or more sensors, a mouse, a keyboard, a microphone configured to detect sounds, and/or the like; and one or more output devices 710, which can include without limitation a display unit such as the device used in embodiments of the invention, a display, printer and/or the like.

The computer system 700 may further include (and/or be in communication with) one or more non-transitory storage devices 706, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 712, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 712 may permit data to be exchanged with a network, other computer systems, and/or any other devices described herein. In many embodiments, the computer system 700 will further comprise a non-transitory working memory 718, which can include a RAM or ROM device, as described above.

The computer system 700 also can comprise software elements, shown as being currently located within the working memory 718, including an operating system 714, device drivers, executable libraries, and/or other code, such as one or more application programs 716, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 706 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 700 may be omitted or may be implemented separate from the illustrated system. For example, the processor 704 and/or other elements may be implemented separate from the input device 708. In some embodiments, elements in addition to those illustrated in FIG. 7 may be included in the computer system 700.

Some embodiments may employ a computer system (such as the computer system 700) to perform methods in accordance with the disclosure. For example, some or all of the procedures of the described method in FIG. 6 may be performed by the computer system 700 in response to processor 704 executing one or more sequences of one or more instructions (which might be incorporated into the operating system 714 and/or other code, such as an application program 716) contained in the working memory 718. Such instructions may be read into the working memory 718 from another computer-readable medium, such as one or more of the storage device(s) 706. Merely by way of example, execution of the sequences of instructions contained in the working memory 718 might cause the processor(s) 704 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 700, various computer-readable media might be involved in providing instructions/code to processor(s) 704 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 706. Volatile media include, without limitation, dynamic memory, such as the working memory 718. Transmission media include, without limitation, coaxial cables, copper wire and fiber optics, including the wires that comprise the bus 702, as well as the various components of the communications subsystem 712 (and/or the media by which the communications subsystem 712 provides communication with other devices). Hence, transmission media can also take the form of waves (including without limitation radio, acoustic and/or light waves, such as those generated during radio-wave and infrared data communications).

In one embodiment, means for obtaining signals may include input devices 708 (e.g., sensors), or any other means that can be used to obtain, measure or receive these signals. Moreover, means for generating, and means for estimating may correspond to processor(s) 704 or any other means capable of performing these functions.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 712 (and/or components thereof) generally will receive the signals, and the bus 702 then might carry the signals (and/or the data, instructions, etc. carried by the signals) to the working memory 718, from which the processor(s) 704 retrieves and executes the instructions. The instructions received by the working memory 718 may optionally be stored on a non-transitory storage device 706 either before or after execution by the processor(s) 704.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for estimating a distance of an object from a Light Detection and Ranging (LIDAR) system, comprising:
    transmitting a first light signal towards the object using a LIDAR system;
    detecting a second light signal by a light sensor to generate a detected signal, the second light signal comprising a reflection of the first light signal from the object;
    generating a filtered signal by applying a time-dependent adjustable filter to the detected signal, wherein the time-dependent adjustable filter comprises at least a first cutoff frequency corresponding to a first time duration, and a second cutoff frequency corresponding to a second time duration, the first time duration corresponding to the time of transmission of the first light signal and a first time threshold, the second time duration corresponding to the time between the first time threshold and the second time threshold; and
    estimating the distance of the object from the LIDAR system based at least on the filtered signal.

2. The method of claim 1, wherein the time-dependent adjustable filter is a variable frequency low-pass filter.

3. The method of claim 1, wherein the first cutoff frequency of the time-dependent adjustable filter is adjusted based on an elapsed time since transmission of the first light signal.

4. The method of claim 1, wherein the second cutoff frequency of the time-dependent adjustable filter is adjusted based on an expected amount of spreading in the second light signal.

5. The method of claim 1, wherein the first cutoff frequency is larger than the second cutoff frequency.

6. The method of claim 1, wherein the time-dependent adjustable filter comprises at least two capacitors disposed in parallel, and one or more switches connected to the at least two capacitors.

7. An apparatus for estimating a distance of an object from a Light Detection and Ranging (LIDAR) system, comprising:
    at least one processor configured to:
        transmit a first light signal towards the object using a LIDAR system;
        detect a second light signal by a light sensor to generate a detected signal, the second light signal comprising a reflection of the first light signal from the object;
        generate a filtered signal by applying a time-dependent adjustable filter to the detected signal, wherein the time-dependent adjustable filter comprises at least a first cutoff frequency corresponding to a first time duration, and a second cutoff frequency corresponding to a second time duration, the first time duration corresponding to the time of transmission of the first light signal and a first time threshold, the second time duration corresponding to the time between the first time threshold and the second time threshold;
        estimate the distance of the object from the LIDAR system based at least on the filtered signal; and
    a memory coupled to the at least one processor.

8. The apparatus of claim 7, wherein the time-dependent adjustable filter is a variable frequency low-pass filter.

9. The apparatus of claim 7, wherein the first cutoff frequency of the time-dependent adjustable filter is adjusted based on an elapsed time since transmission of the first light signal.

10. The apparatus of claim 7, wherein the second cutoff frequency of the time-dependent adjustable filter is adjusted based on an expected amount of spreading in the second light signal.

11. The apparatus of claim 7, wherein the first cutoff frequency is larger than the second cutoff frequency.

12. The apparatus of claim 7, wherein the time-dependent adjustable filter comprises at least two capacitors disposed in parallel, and one or more switches connected to the at least two capacitors.

13. An apparatus for estimating a distance of an object from a Light Detection and Ranging (LIDAR) system, comprising:
 means for transmitting a first light signal towards the object using a LIDAR system;
 means for detecting a second light signal by a light sensor to generate a detected signal, the second light signal comprising a reflection of the first light signal from the object;
 means for generating a filtered signal by applying a time-dependent adjustable filter to the detected signal, wherein the time-dependent adjustable filter comprises at least a first cutoff frequency corresponding to a first time duration, and a second cutoff frequency corresponding to a second time duration, the first time duration corresponding to the time of transmission of the first light signal and a first time threshold, the second time duration corresponding to the time between the first time threshold and the second time threshold; and
 means for estimating the distance of the object from the LIDAR system based at least on the filtered signal.

14. The apparatus of claim 13, wherein the time-dependent adjustable filter is a variable frequency low-pass filter.

15. The apparatus of claim 13, wherein the first cutoff frequency of the time-dependent adjustable filter is adjusted based on an elapsed time since transmission of the first light signal.

16. The apparatus of claim 13, wherein the second cutoff frequency of the time-dependent adjustable filter is adjusted based on an expected amount of spreading in the second light signal.

17. The apparatus of claim 13, wherein the first cutoff frequency is larger than the second cutoff frequency.

18. The apparatus of claim 13, wherein the time-dependent adjustable filter comprises at least two capacitors disposed in parallel, and one or more switches connected to the at least two capacitors.

19. A non-transitory processor-readable medium for estimating a distance of an object from a Light Detection and Ranging (LIDAR) system, comprising processor-readable instructions configured to cause one or more processors to:
 transmit a first light signal towards the object using a LIDAR system;
 detect a second light signal by a light sensor to generate a detected signal, the second light signal comprising a reflection of the first light signal from the object;
 generate a filtered signal by applying a time-dependent adjustable filter to the detected signal, wherein the time-dependent adjustable filter comprises at least a first cutoff frequency corresponding to a first time duration, and a second cutoff frequency corresponding to a second time duration, the first time duration corresponding to the time of transmission of the first light signal and a first time threshold, the second time duration corresponding to the time between the first time threshold and the second time threshold; and
 estimate the distance of the object from the LIDAR system based at least on the filtered signal.

20. The non-transitory processor-readable medium of claim 19, wherein the time-dependent adjustable filter is a variable frequency low-pass filter.

21. The non-transitory processor-readable medium of claim 19, wherein the first cutoff frequency of the time-dependent adjustable filter is adjusted based on an elapsed time since transmission of the first light signal.

22. The non-transitory processor-readable medium of claim 19, wherein the second cutoff frequency of the time-dependent adjustable filter is adjusted based on an expected amount of spreading in the second light signal.

23. The non-transitory processor-readable medium of claim 19, wherein the first cutoff frequency is larger than the second cutoff frequency.

24. The non-transitory processor-readable medium of claim 19, wherein the time-dependent adjustable filter comprises at least two capacitors disposed in parallel, and one or more switches connected to the at least two capacitors.

* * * * *